United States Patent
Ding et al.

(10) Patent No.: US 6,671,274 B1
(45) Date of Patent: *Dec. 30, 2003

(54) LINK LIST OPERABLE TO INCREASE MEMORY BANDWIDTH IN A TRANSMISSION SYSTEM

(75) Inventors: James Ding, Fremont, CA (US); Hariprasad Ginjpalli, Cupertino, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/346,558
(22) Filed: Jun. 30, 1999
(51) Int. Cl.[7] ............................... H04L 12/28
(52) U.S. Cl. .................... 370/389; 370/395.7
(58) Field of Search ................ 370/351, 389, 370/395.1, 395.3, 395.4, 395.7, 395.71, 395.72, 402, 475, 458, 438; 711/1, 2, 100, 101, 104, 106, 147–150, 211

(56) References Cited

U.S. PATENT DOCUMENTS

| | | | | |
|---|---|---|---|---|
| 5,621,731 A | * | 4/1997 | Dale et al. | 370/257 |
| 6,000,020 A | * | 12/1999 | Chin et al. | 711/162 |
| 6,061,351 A | * | 5/2000 | Erimli et al. | 370/390 |
| 6,111,880 A | * | 8/2000 | Rusu et al. | 370/395.53 |
| 6,188,690 B1 | * | 2/2001 | Holden et al. | 370/390 |
| 6,233,244 B1 | * | 5/2001 | Runaldue et al. | 370/412 |
| 6,335,935 B2 | * | 1/2002 | Kadambi et al. | 370/389 |
| 6,349,097 B1 | * | 2/2002 | Smith | 370/390 |
| 6,356,557 B1 | * | 3/2002 | Nichols et al. | 370/449 |
| 6,370,138 B1 | * | 4/2002 | Kim et al. | 370/353 |

OTHER PUBLICATIONS

U.S. patent application Ser. No. 09/316,558, James Ding, et al., filed Jun. 30, 1999.

* cited by examiner

Primary Examiner—David Vincent
(74) Attorney, Agent, or Firm—Blakely, Sokoloff, Taylor & Zafman LLP

(57) ABSTRACT

A transmission system operable to store a plurality of transmission cells is disclosed. The transmission system comprises a first memory coupled to a plurality of signals and a first data bus. The transmission system also comprises a second memory coupled to the plurality of signals and a second data bus. The transmission system further comprises a controller coupled to the first memory device and the second memory device. The controller is operable to maintain a list comprising the available storage blocks in the first memory.

26 Claims, 6 Drawing Sheets

LINK LIST OPERABLE TO INCREASE MEMORY BANDWIDTH IN A TRANSMISSION SYSTEM

FIELD OF THE INVENTION

The present invention relates to memories in transmission systems. More particularly, the present invention relates to the use of link lists and separate memory divisions to increase the bandwidth of the memories.

BACKGROUND

Developments in router technology have led to system designs that provide a general-purpose connection-oriented transfer mode for a wide range of services. These services include the simultaneous transfer of integrated traffic (data, voice, and video traffic) over network systems. Prior art designs have typically relied on synchronous dynamic random access memories ("SDRAMs") to temporarily store the integrated traffic transmitted between intermediate nodes of these network systems.

The SDRAMs are typically located in the routers or switches of the network system. Typically, an SDRAM is used to store an incoming data cell until the components of the router have processed the cell for transfer to another router or destination. For example, an asynchronous transfer mode ("ATM") network transmits ATM cells. Accordingly, an ATM cell may be stored in the SDRAM of a router until the switching circuit of the router determines the destination of the ATM cell. Subsequently, the ATM cell is retrieved from the SDRAM and transmitted to the destination node determined by the switching circuit.

FIG. 1 shows a prior art SDRAM used to store ATM cells. In particular, system 100 includes an SDRAM (110) coupled to a controller (control 140) via line 145. The storage blocks of SDRAM 110 are addressed by address 120. Accordingly, address 120 may be used to select a memory address for storing an ATM cell (135) received on data 130. Alternatively, address 120 may be used to specify a memory address to retrieve and ATM cell from SDRAM 110. The retrieved ATM cell is transferred on data 130 to a switching circuitry (not shown) that places header information on the cell. Subsequently, the header information may be used to route the ATM cell across a network.

For example, in an ATM network that establishes a virtual channel connection ("VCC") between nodes of the ATM. The VCC typically consists of multiple virtual connections and multiple virtual paths. Specifically, a link of the ATM network includes multiple virtual paths, each virtual path identified by a virtual path identifier ("VPI"). Additionally, a link of the ATM network includes multiple virtual connections, each virtual connection identified by a virtual channel identifier ("VCI"). Accordingly, the switching circuitry may retrieve a cell from SDRAM 110 and attach VPI and VCI header information to the cell prior to transmission over an ATM network.

In an ATM network, cell 135 typically comprises fifty-three bytes of data. Accordingly, data line 130 is 128 bits wide and the storage (i.e., writing) or retrieval (i.e., reading) of cell 135 takes four clock cycles. Thus, system 100 provides a basic system for temporarily storing the cells of a network router in a four clock cycle period.

System 100, however, results in numerous disadvantages when used in a transmission system that requires multiple read and write operations. System 100 also results in numerous disadvantages when used in a router that requires a high data transmission bandwidth. One disadvantage results from the timing restriction of conventional SDRAMs. Specifically, multiple accesses to the same bank of an SDRAM require a pre-charge (i.e., dead) period between each access. Typically, the pre-charge period may last as long as 10 clock cycles. Another disadvantage results from the operation speed of ATM networks. In particular, during high speed operations (e.g., 2.4 gigabits per second), control 140 may process a large number of cells (both arriving and departing from a switch or a router) in a limited number of clock cycles. The current 128 bit bus implementation of SDRAM 110, however, places constraints on the data transfer speed of system 100, thus reducing the processing speed of control 140. Yet another disadvantage results from the design characteristics of SDRAMs. In particular, during a refresh of an SDRAM, data may not be read or written from the SDRAM. Additionally, the transition between a read and write period of an SDRAM requires a dead period. Thus, the design characteristics of the SDRAMs place constraints on the burst transfer of data between system 100 and a remote system.

SUMMARY AND OBJECTS OF THE INVENTION

It is an object of the invention to provide a memory system that stores both ingress and egress cells in a transmission system with a high speed data bandwidth requirement.

It is another object of the invention to provide a switch that uses an efficient memory system to stores both ingress and egress cells.

It is a further object of the invention to reduce bank conflicts during the storage and retrieval of ingress and egress cells in the memory device of a transmission system.

It is a further object of the invention to provide a memory system in a switch that can process ingress or egress cells during a memory refresh.

A transmission system is described that is operable to store a plurality of transmission cells. The transmission system comprises a first memory coupled to a plurality of signals and a first data bus. The first memory is operable to store a first set of the plurality of transmission cells. The transmission system also comprises a second memory coupled to the plurality of signals and a second data bus. The second memory is operable to store a second set of the plurality of transmission cells. The transmission system further comprises a controller coupled to the first memory device and the second memory device. The controller is operable to maintain a list comprising the available storage blocks in the first memory.

Other objects, features, and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

An apparatus and method for increasing the data transfer of a memory device in a transmission system is disclosed. The memory device is used to temporarily store cells arriving and departing from the transmission system. The cells arriving externally from the transmission system are referred to as ingress cells and the cells retrieved internally from the transmission system are referred to as egress cells. For one embodiment, during a given time period, the number of ingress and egress transfers are increased, thus allowing the transmissions system to transmit and receive cells over a high speed network. For another embodiment, the transmission system comprises a switch in an asynchronous transfer mode ("ATM") network. Thus, the memory device is operable to store ATM cells. For alternative embodiments, the memory device is operable to store cells used in a Frame Relay network, a High-level Data Link Control ("HDLC") network, an Internet Protocol ("IP") network, or a Time Division Multiplexed ("TDM") network.

For one embodiment, the memory device includes multiple physical memories with each physical memory having multiple storage banks. A link list is used to maintain a list of available blocks in each bank of the memory system. A controller coupled to the memory system may use the link list to determine which blocks in the memory system are available to store transmission cells. For alternative embodiments, the link list may be maintained in storage devices comprising, but not limited to, a group of registers, a memory device, or application specific integrated circuits.

The use of a link list and multiple physical memories allows the transmission system to efficiently process transmission cells (i.e., cells received from a network or cells that may be transmitted over a network). Accordingly, an intended advantage of an embodiment of the invention is to provide a memory system that stores both ingress and egress cells in a transmission system with a high speed data bandwidth requirement.

Another intended advantage of an embodiment of the invention is to reduce bank conflicts during the storage and retrieval of ingress and egress cells. For example, a link list may be used to record the available blocks in a bank. Thus, for a given time period, based on the block and bank that a cell is read from, a block address included in the link list may be selected to perform a write of either an egress or ingress cell.

Yet another intended advantage of an embodiment of the invention is to provide a memory system in a switch that can process ingress or egress cells during a memory refresh.

Figure 1:
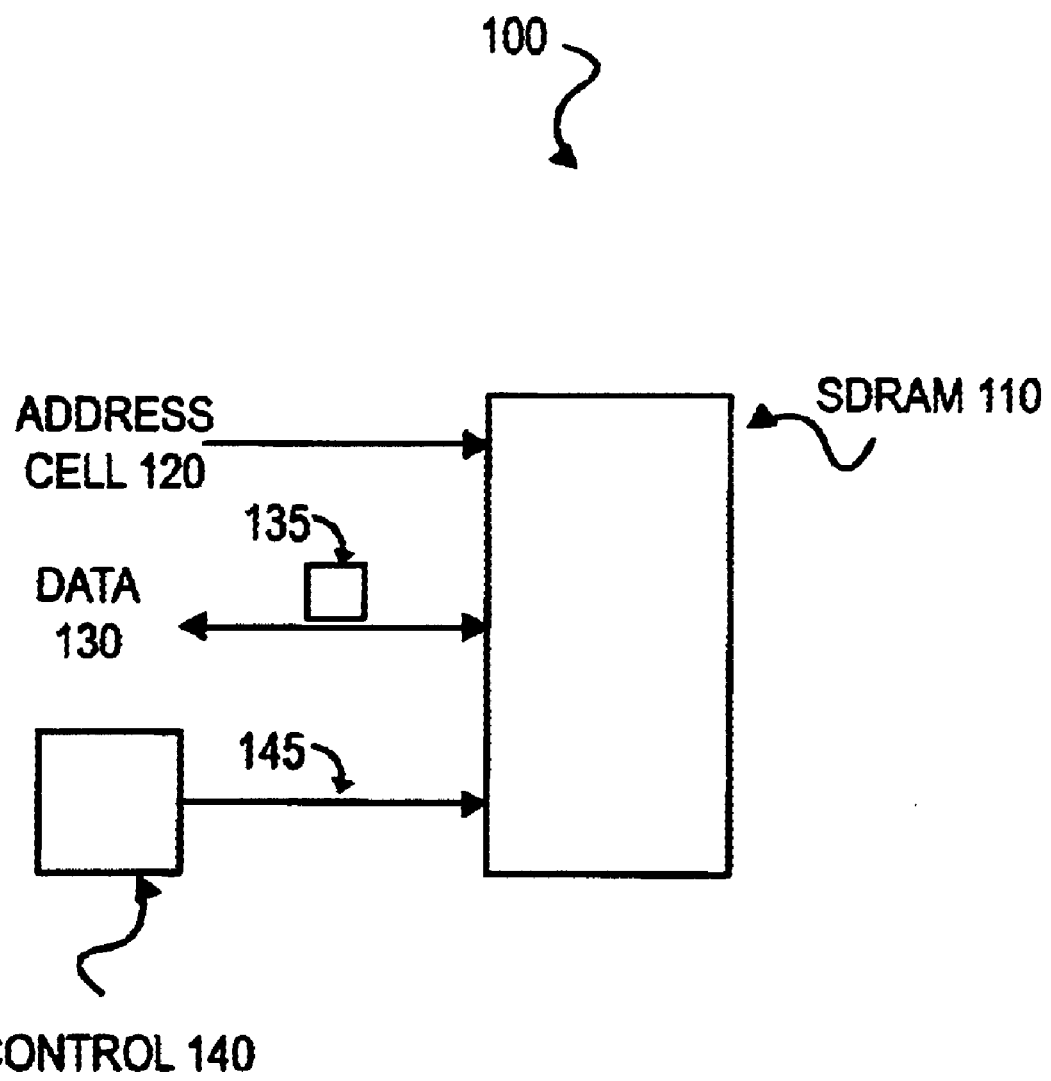
FIG. 1 shows a prior art synchronous dynamic random access memory used to store ATM cells.
Figure 2:
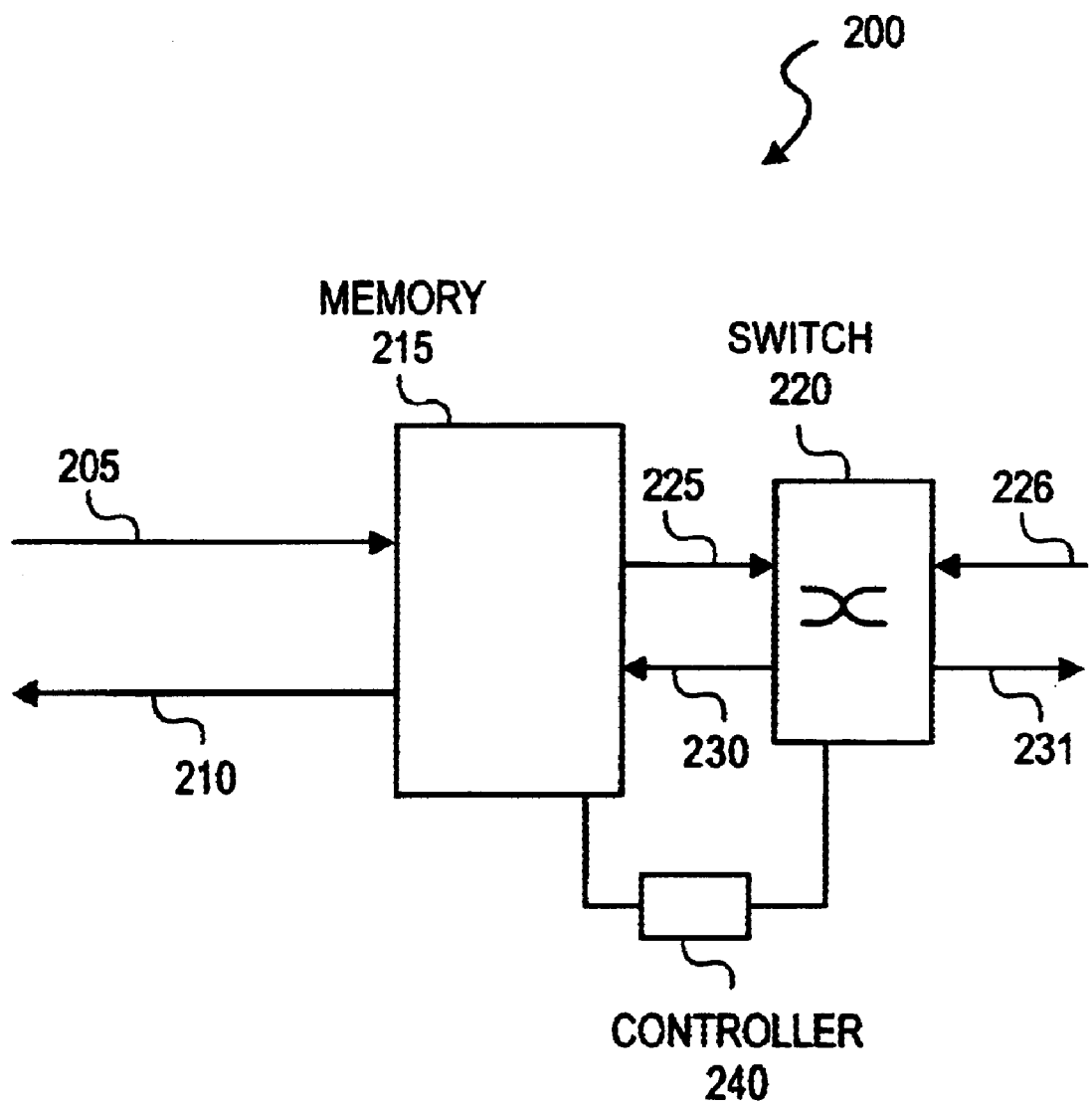
FIG. 2 illustrates a transmission card with a memory system operable to store transmission cells.

FIG. 2 illustrates one embodiment of a transmission card with a memory system operable to store transmission cells. In particular, card 200 comprises a memory (215) coupled to a switch (220) via lines 225 and 230. Card 200 also comprises an input (line 205) and an output (line 210) channel. The channels may be used to transfer data between transmission cards on remote sites. For an alternative embodiment, card 200 comprises multiple channels coupled to memory 215.

Card 200 also comprises a controller 240 coupled to memory 215 and switch 220. For one embodiment, controller 240 is operable to determine the address and control signals of memory 215. Thus, controller 240 may select the particular bank or block in which memory 215 stores or retrieves data via line 205 and line 210, respectively.

Lines 205 and 210 allow card 200 to selectively receive and transmit transmission cells. For example, for one embodiment, memory 215 temporarily stores transmission cells that are received via line 205. In particular, the ingress cells received over line 205 are received externally from card 205 and transferred to line 225. The egress cells received over line 230, however, are received internally from switch 220 and transferred to line 210. For another embodiment, switch 220 is a cell switch that selectively transfers cells from line 226 to memory 215 via line 230. Accordingly, switch 220 may transfer data received on line 225 and line 226, thus ultimately switching the transmission cells received on line 205. For an alternative embodiment, the cells on line 226 may arrive from different channels of transmission card 200 or from a second memory element (not shown) of transmission card 200.

As illustrated in FIG. 2, cells may also be retrieved from memory 215 via lines 210 and 225. Specifically, the egress cells on line 210 may be transmitted externally. Alternatively, the ingress on line 225 may be transferred to switch 220. For one embodiment, switch 220 may transfer the egress cells on line 230 to a second memory element (not shown) of card 200. For another embodiment, switch 220 may transfer the egress cells on line 230 to a different channel of card 200.

To increases the bandwidth of card 200—i.e., the transmission rates of ingress and egress cells—the addressing, control signals, data inputs, and physical layout of memory 215 may be varied. The design variation of memory 215 may also be used to reduce conflicts during multiple writes to memory 215.

Figure 3:
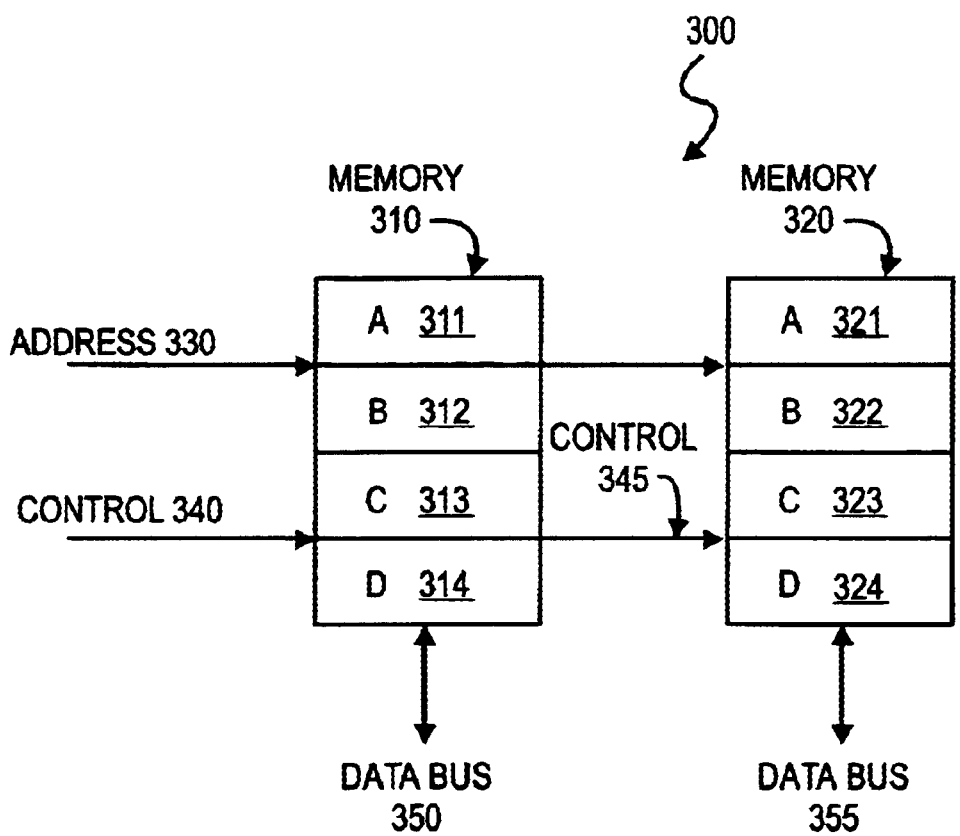
FIG. 3 illustrates a memory system having two separate physical memories.
Figure 3:
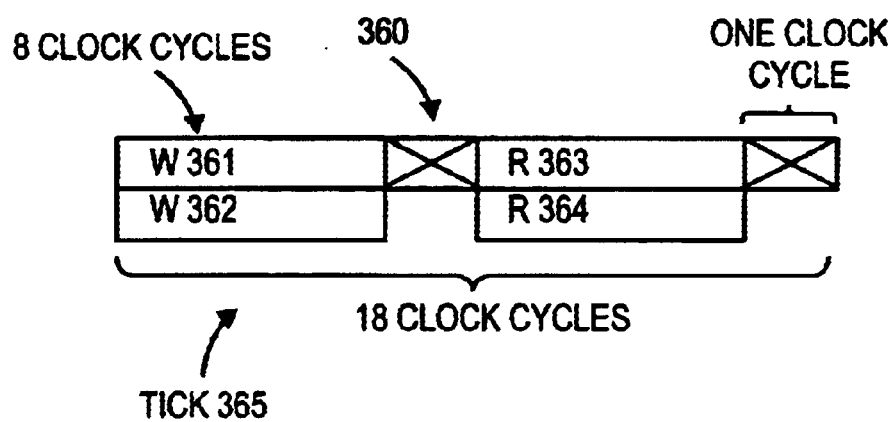

FIG. 3 illustrates one embodiment of a memory system having two separate physical memories. In particular, system 300 comprises memory 310 and memory 320 coupled to data bus 350 and data bus 355, respectively. The data buses 350 and 355 are used to transfer transmission cells to and from memory 310 and memory 320. For example, for one embodiment, both memories (310 and 320) are coupled to an address bus (330). Accordingly, the address bus 330 allows for the individual addressing of memory blocks in each of the memories. Thus, to transfer transmission cells between data bus 350 and memory 310, a controller (not shown) coupled to system 300 may issue read or write commands on control 340. Alternatively, the controller (not shown) may transfer transmission cells between data bus 355 and memory 320 via read or write commands issued on control 345.

For another embodiment, the control 340 and control 345 share the same read and write control signals. Control 340 and control 345, however, use a different chip select ("CS") signal. Thus, a controller (not shown) coupled to system 300 may selectively use the CS signal to determine whether data is transferred between memory 310 and data 350 or between memory 320 and data 355. For yet another embodiment, the CS signal on control 340 is a logical inverse of the CS signal on control 345. Accordingly, the dual memory configuration of system 300 does not have an increased pin count when compared to a single memory configuration.

As illustrated in FIG. 3, each memory comprises multiple banks. Memory 310 comprises banks A311, B312, C313, and D314. Similarly, memory 320 comprises banks A321, B322, C323, and D324. Accordingly, address bus 330 allows for the individual addressing of a block in a given bank of memory 310 or 320. For example, for one embodiment, both data 350 and data 355 comprises a sixty-four bit data bus and a transmission cell comprises sixty-four bytes of data. Additionally, each bank of memories 310 and 320 comprises eight megabytes of storage space. Thus, a bank may store 128 K (128,000) transmission cells.

As previously described, the characteristics of SDRAM memories reduce the transfer rates of egress and ingress cells. System 300, however, provides a memory system that increases the bandwidth of egress and ingress cells, thus increasing the transmission rate of a transmission card that uses system 300. In particular, the separate memory structure of system 300 allows the memory system to read from or write to memory 310 during the refresh of memory 320. Conversely, the separate memory structure of system 300 allows the memory system to read from or write to memory 320 during the refresh of memory 310. Additionally, the separate memory systems provides a medium in which multiple read and write operation may occur in a given time period.

For illustrative purposes an 18 clock cycle time period— also referred to as tick—is used to show the multiple read and write occurrences. The timing of two write and two read operations is illustrated in timing diagram 360. In particular, during the first eight clock cycles of a tick (365), write operations W361 and W362 transfer data into memory 310 and memory 320, respectively. Subsequently, a one clock dead period ensues and read operations R363 and R364 retrieve data from memory 310 and memory 320, respectively. Accordingly, during tick 365 two egress cells and two ingress cells are processed by system 300. For another embodiment, during tick 365 system 300 may perform two writes to memory 310 during the refresh of memory 320. Alternatively, during tick 365 system 300 may perform two writes to memory 330 during the refresh of memory 310. For yet another embodiment, the memory devices are coupled to different egress and ingress cells—i.e., the memory devices of system 300 are used as a separate ingress and egress memory. In particular, memory 310 is used to store egress cells and memory 320 is used to store ingress cells. Accordingly, during the refresh of memory 310 ingress cells are processed and alternatively during the refresh of memory 320 egress cells are processed.

The multiple read and writes performed during a tick allow system 300 to increase data bandwidth. Prior to performing the multiple operations, however, a list of the available blocks allows a controller coupled to system to determine which memory, bank, and blocks should be used to perform the data transfer. For one embodiment, a link list is used to maintain a list of available blocks—i.e., blocks that are available to store cells. Accordingly, the link list provides a controller with the flexibility to select different banks for storing data without creating bank conflicts.

Figure 4:
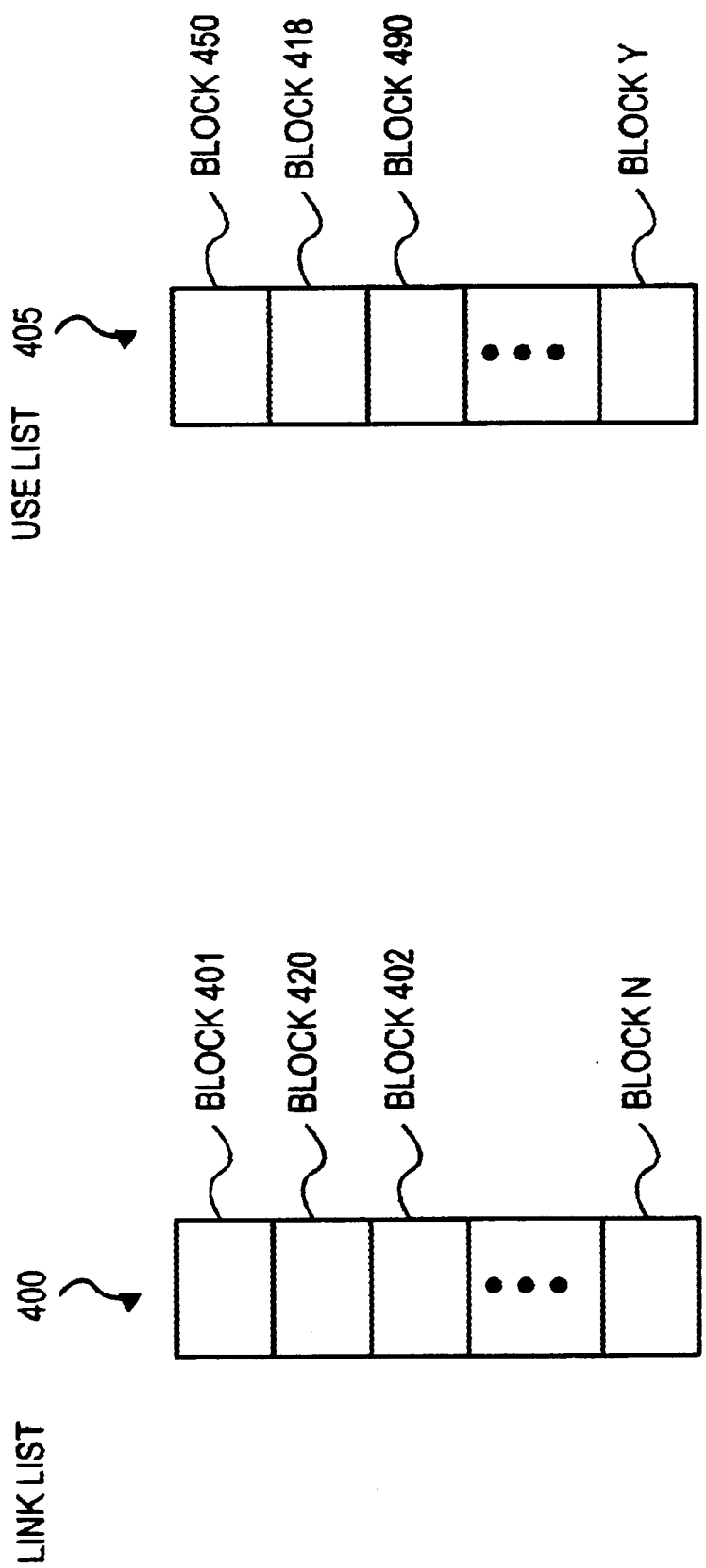
FIG. 4 shows a link list used by the memory system of FIG. 3.

FIG. 4 illustrates one embodiment of a link list used by the memory system of FIG. 3. In particular, link list 400 comprises the addresses of available blocks in bank A311. Thus, as a cell is written into memory 310 via data 350 the address of the written block is removed from link list 400. Accordingly, a controller coupled to system 300 may use link list 400 to determine the blocks available in bank A311. Thus, if an ingress cell must be stored in memory 310, the controller may examine the link lists of memory 310, including link list 400, to determine the block and bank in which the cell may be stored. Subsequently, after the memory is stored in a particular block, the address of the block is removed from the link list corresponding to the block. Alternatively, for one embodiment, an egress cell is read from memory 310. After the memory is read from a particular block, the address of the block is added to the link list corresponding to the block. For one embodiment, the link list is maintained by a controller (not shown) coupled to system 300. For another embodiment, the link list is maintained by system 300. For yet another embodiment, the link list comprises a truncated list of available addresses. Specifically, each entry of the link list corresponds to a subset of the values used to denote an address in memory 310 or memory 320.

As illustrated in FIG. 4, link list 400 comprises the addresses of blocks 401, 420, 402, and N. For one embodiment, during the reset of system 300 all the blocks of the bank A311 are available. Thus, link list 400 comprises, in ascending order, the addresses of all the blocks of bank A311. During operation of the memory system, however, as cells are read and written from bank A311, the order of the available block addresses changes. Accordingly, link list 400 illustrates a possible address configuration of the blocks of banks A311 during normal operation.

For example, if a controller coupled to system 300 writes a cell to block 401 of bank A311, the cell will be stored in the address corresponding to block 401. Accordingly, the address of block 401 will be removed from link list 400 and the address of block 420 will be used to indicate the next available storage space in bank A311. Alternatively, if a controller coupled to system 300 reads a cell from a block of bank A311, the address of the read block will be appended to link list 400. The selection of a particular bank is illustrated below in conjunction with FIG. 5.

For another embodiment, a use list may also be used to maintain the addresses of blocks that are currently storing cells. In particular, use list 405 comprises the storage addresses of the blocks in bank A311. Thus, as a cell is written into memory 310 via data 350, the address of the written block is added to use list 405. Accordingly, a controller coupled to system 300 may utilize use list 405 to determine the used blocks in bank A311. Thus, if an ingress cell is stored in memory 310, the controller may examine the use lists of memory 310, including use list 405, to determine the block and bank in which the memory may be stored. Subsequently, after the memory is stored in a particular block, the address of the bock is added to the use list corresponding to the block. Alternatively, for one embodiment, an egress cell is read from memory 310. After the memory is read from a particular block, the address of the bock is removed from the use list corresponding to the block. For one embodiment, the use list is maintained by a controller (not shown) coupled to system 300. For another embodiment, the use list is maintained by system 300.

As illustrated in FIG. 4, use list 405 comprises the addresses of blocks 450, 418, 490, and Y. For one embodiment, during the reset of system 300 all the blocks of the bank A311 are available. Thus, use list 405 comprises no data. During operation of the memory system, however, as cells are read and written from bank A311 the contents of use list 405 changes. Accordingly, use list 405 illustrates a possible address configuration of the blocks of banks A311 during normal operation.

For example, if a controller coupled to system 300 writes a cell to bank A311 via data 350, the cell will be stored in the address corresponding to block 450. Thus, as illustrated, the address of block 450 will be added to use list 405. Alternatively, if a controller coupled to system 300 reads a cell from block 418 of bank A311, the address of block 418 will be removed from use list 405 subsequent to the retrieval of the cell.

As previously described, for one embodiment, the memory devices of system 300 may be configured to operate as separate ingress and egress memory devices. For another embodiment, the memory devices may be configured to perform logical bank sharing.

Figure 5:
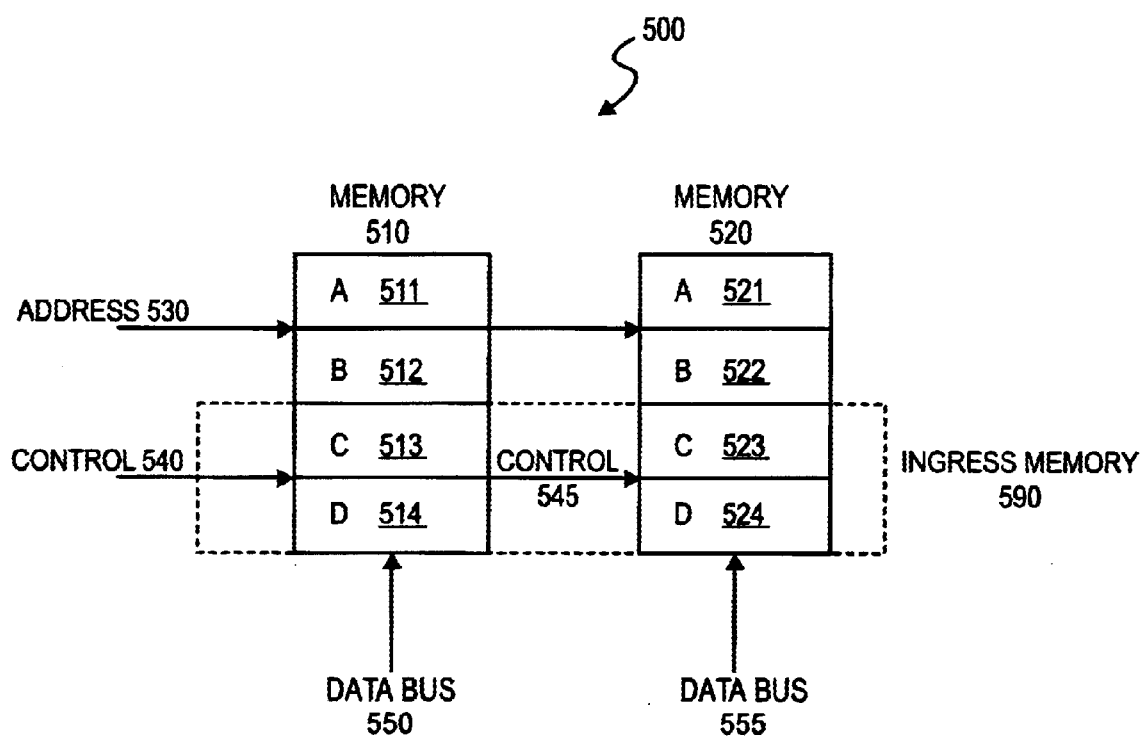
FIG. 5 shows logical bank sharing.

FIG. 5 illustrates one embodiment of logical bank sharing. In particular, system 500 comprises memory 510 and memory 520 coupled to data bus 550 and data bus 555, respectively. The data buses 550 and 555 are used to transfer transmission cells to and from memory 510 and memory 520. For example, for one embodiment, both memories (510 and 520) are coupled to an address bus (530). Accordingly, the address bus 530 allows for the individual addressing of memory blocks in each of the memories. Thus, to transfer transmission cells between data bus 550 and memory 510, a controller (not shown) coupled to system 500 may issue read or write commands on control 540. Alternatively, the controller (not shown) may transfer transmission cells between data bus 555 and memory 520 via read or write commands issued on control 545.

For another embodiment, the control 540 and control 545 share the same read and write control signals. Control 540 and control 545, however, use a different CS signal. Thus, a controller (not shown) coupled to system 500 may selectively use the CS signal to determine whether data is transferred between memory 510 and data 550 or between memory 520 and data 555. For yet another embodiment, the CS signal on control 540 is a logical inverse of the CS signal on control 545. Accordingly, the dual memory configuration of system 500 does not have an increased pin count when compared to a single memory configuration.

As illustrated in FIG. 5, each memory comprises multiple banks. Memory 510 comprises banks A511, B512, C513, and D514. Similarly, memory 520 comprises banks A521, B522, C523, and D524. Accordingly, address bus 530 allows for the individual addressing of block in a given bank of memory 510 or 520. For example, for one embodiment, both data 550 and data 555 comprises a sixty-four bit data bus and a transmission cell comprises sixty-four bytes of data. Additionally, each bank of memories 510 and 520 comprises eight megabytes of storage space. Thus, a bank may store 128 K transmission cells.

In contrast to system 300, however, the memory devices of system 500 comprise shared logical banks between memory 510 and 520. For example, for one embodiment, two banks of memory 510 (C513 and D514) and two banks of memory 520 (C523 and D524) are logically combined into ingress memory 590. Accordingly, banks C513, C514, C523, and C524—hereinafter ingress memory 590—are operable to store and retrieve ingress transmission cells. The remaining banks (A511, B 512, A521, and B522) may be used as an egress memory.

The logical bank sharing allows system 500 to process a larger number of transmission cells than system 300. Following the previous example, for a given tick, ingress memory 590 may perform three write operations while one of the banks of the egress memory performs a read operation. Specifically, if C513, D514 and C523 are used to perform a write operation of ingress transmission cells, either bank A521 or bank B522 may be used to perform a read of an egress transmission cell. Alternatively, for a given tick, ingress memory 590 may perform a read operation while three banks of the egress memory perform write operations.

Additionally, either memory 510 or memory 520 may perform two writes during the refresh of the other memory. Thus, after determining the number of cells to be read or after determining whether a refresh is required, a controller (not shown) coupled to system 500 may use a link list or a use list to determine the banks used to write the transmission cells. For example, if a refresh operation is required, the controller may perform two writes in the non-refreshed physical memory (memory 510 or memory 520) of system 500. Alternatively, if a read operation is required, the controller may perform three writes in the non-read accessed logical memory (the egress memory or ingress memory 590) of system 500.

Both separate memories and shared logical banks sharing provide a flexible system that increase the bandwidth of memory systems. The use of a link list with either the separate memory configuration or the shared logical bank configuration, however, also provides a configuration in which unequal logical direction cell storage or additional separate memories may be used in conjunction with the separate memory configuration or the shared logical bank configuration.

Figure 6:
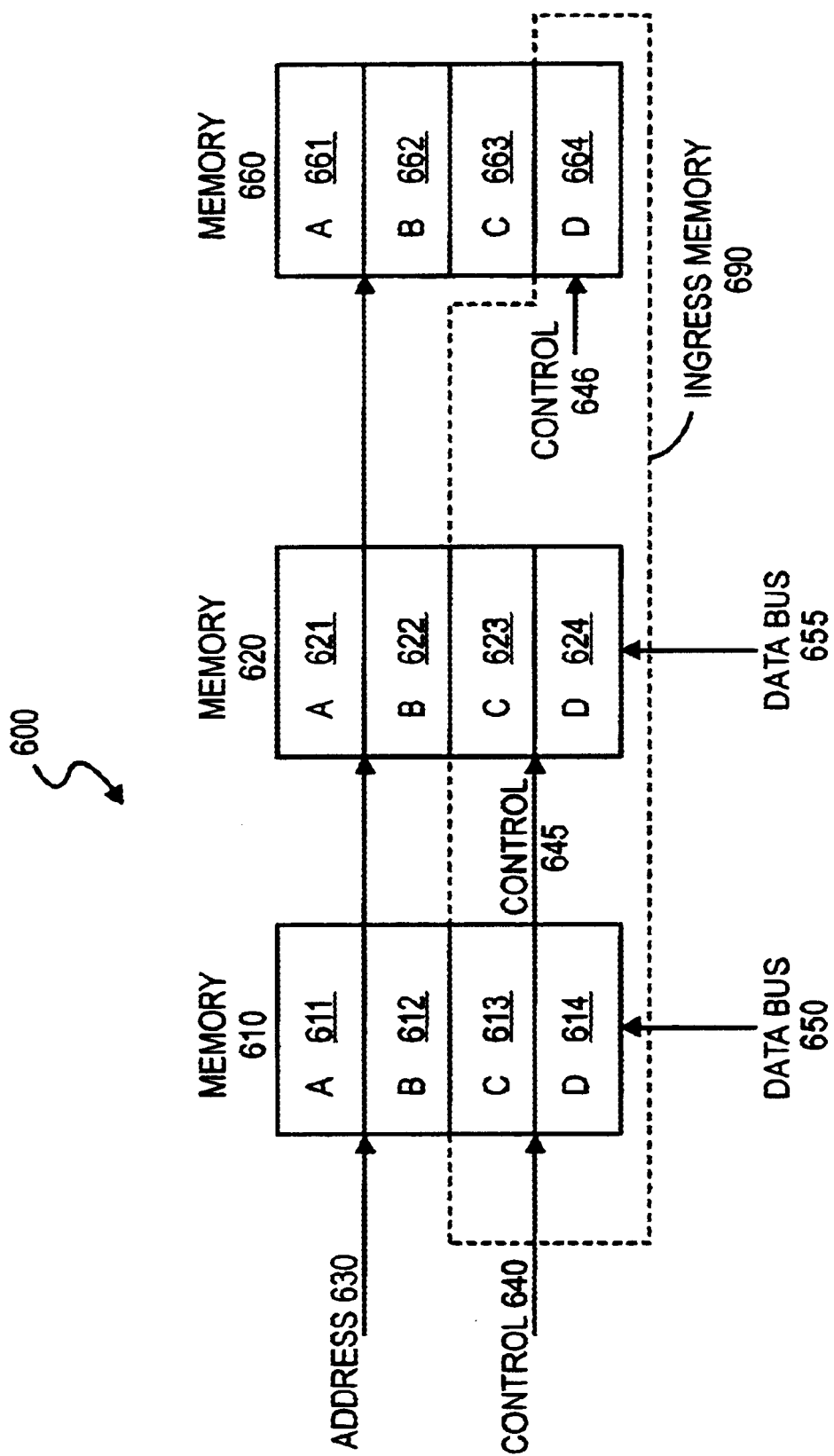
FIG. 6 shows a memory system having three separate physical memories.

FIG. 6 shows one embodiment of a memory system having three separate physical memories. FIG. 6 also illustrates a logical bank sharing memory system with an unequal logical direction cell storage. Specifically, the unequal logical direction cell storage comprises an egress memory (banks A611, B612, A621, B622, A661, B662, C663) with a larger number of banks than ingress memory 690.

As illustrated in FIG. 6, system 600 comprises memory 610 and memory 620 coupled to data bus 650 and data bus 655, respectively. The data buses 650 and 655 are used to transfer transmission cells to and from memory 610 and memory 620. For example, for one embodiment, both memories (610 and 620) are coupled to an address bus (630). Accordingly, the address bus 630 allows for the individual addressing of memory blocks in each of the memories. Thus, to transfer transmission cells between data bus 650 and memory 610, a controller (not shown) coupled to system 600 may issue read or write commands on control 640. Alternatively, the controller (not shown) may transfer transmission cells between data bus 655 and memory 620 via read or write commands issued on control 645.

As further illustrated in FIG. 6, each memory comprises multiple banks. Memory 610 comprises banks A611, B612, C613, and D614. Similarly, memory 620 comprises banks A621, B622, C623, and D624. Accordingly, address bus 630 allows for the individual addressing of block in a given bank of memory 610 or 620.

For another embodiment, the control 640 and control 645 share the same read and write control signals. Control 640 and control 645, however, use a different CS signal. Thus, a controller (not shown) coupled to system 600 may selectively use the CS signal to determine whether data is transferred between memory 610 and data 650 or between memory 620 and data 655.

System 600 also comprises an additional memory (660) coupled to memory 610 and memory 620. Similar to memory 610 and memory 620, memory 660 is addressed by address 630 and receives read and write commands via control 646. Memory 660, however, does not include an additional data bus. Instead, the banks of memory 660 are coupled to the banks of memory 610 or memory 620.

For example, for one embodiment, banks A661 and B662 are coupled to bank A621. Additionally, bank C663 is coupled to bank B622. Thus, data is transferred to banks A661, B662, and C663 via data 655. Similarly, bank D664 is coupled to bank D624 of memory 620. Thus, data is also transferred to bank D664 via data 655.

For one embodiment, system 600 is used in conjunction with link lists. Accordingly, the use of links lists allows a controller (not shown) coupled to system 600 to use bank D664 as an additionally storage medium for ingress cells. Similarly, the use of links lists allows the controller to use banks A661, B662, and C663 as additional storage banks for egress cells.

In the foregoing specification, the invention has been described with reference to specific exemplary embodiments thereof. For example, for one embodiment, an eighteen clock cycle (tick) period has been used to describe different read and write scenarios for a memory system of a transmission card. For alternative embodiments, however, a different number of clock cycles or memory systems used or other the memory system may be used in other devices such as processors. Thus, it will be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A transmission system, comprising:
    a first memory coupled to an address bus and coupled to a first data bus, said first memory having a first memory bank and a second memory bank; and,
    a second memory coupled to said address bus and coupled to a second data bus, said second memory having a first memory bank and a second memory bank, wherein said first memory banks of said first and second memories form part of an ingress memory to store ingress transmission cells before said ingress transmission cells are sent to a switch, and wherein said second memory banks of said first and second memories form part of an egress memory to store egress transmission cells after said egress transmission cells have been switched, said ingress memory positioned before said switch along an ingress path of said transmission system, said egress memory positioned after said switch along an egress path of said transmission system.

2. The transmission system of claim 1 further comprising a controller coupled to said first memory device and said second memory device, wherein said controller is operable to maintain a list, said list further comprising a plurality of sublists, each sublist comprising the addresses of the available storage blocks in a bank of said first memory.

3. The transmission system of claim 1, wherein said first memory comprises an SDRAM.

4. The transmission system of claim 3, wherein said plurality of signals comprises an address bus.

5. The transmission system of claim 4, wherein said plurality of signals further comprises a control signal.

6. The transmission system of claim 5, wherein said control signal comprises a chip select signal operable to select said first memory or the said second memory.

7. The transmission system of claim 1, wherein an ingress ATM cell can be stored into said ingress memory.

8. The transmission system of claim 1, wherein an egress ATM cell can be read from said egress memory.

9. A method, comprising:
    writing an ingress unit into a first bank of either a first memory or a second memory with an address bus;
    reading an egress unit from another bank of the same memory that said ingress unit was written into with the address bus and forwarding said egress unit to read from said another bank to a switch; and,
    writing, with the address bus, a second ingress unit into the first bank of whichever of the first memory and the second memory that the ingress unit was not written into while the whichever of the first memory and the second memory that the ingress unit was written into is being refreshed.

10. The method of claim 9, further comprising, prior to the reading, examining a read operation to determine the a location of the egress memory.

11. The method of claim 9, wherein the egress unit further comprises an egress ATM cell.

12. The method of claim 11, wherein the ingress unit further comprises an ingress ATM cell.

13. An apparatus, comprising:
    means for storing an ingress unit, prior to said ingress unit being internally switched, with a first group of memory banks, each memory bank of said first group of memory banks residing within a different memory; and,
    means for storing an egress unit, after said egress unit has been internally switched, with a second group of memory banks, each memory bank of said second group of memory banks residing within a different one of said memories, said different memories sharing a same address bus.

14. The apparatus of claim 13 wherein said ingress unit is an ingress ATM cell.

15. The apparatus of claim 13 wherein said egress unit is an egress ATM cell.

16. The apparatus of claim 13 wherein a first of said memories is accessed while a second of said memories is refreshed.

17. An apparatus, comprising:
    a) a first memory arrangement to store ingress units, comprising:
        i) at least a first bank of a first memory, said first memory coupled to a first data bus, said first data bus to carry said ingress units to and from said first memory;
        ii) at least a first bank of a second memory, said second memory coupled to a second data bus, said second data bus to carry said ingress units to and from said second memory;
    b) a second memory arrangement to store egress units, comprising:
        i) at least a second bank of said first memory, said first data bus to also carry said egress units to and from said first memory;
        ii) at least a second bank of said second memory, said second data bus to also carry said egress units to and from said second memory;
    c) an address bus, said address bus coupled to both said first and second memories, said address bus to carry:
        i) a write address to write ingress units into said first memory arragement;
        ii) a read address to read ingress units from said first memory arrangement;
        iii) a write address to write egress units into said second memory arrangement; and,
        iv) a read address to read egress units from said second memory arrangement;
    d) switch coupled to said first memory arrangement and said second memory arrangement, said switch to switch said ingress units.

18. The apparatus of claim 17 further comprising a third memory coupled to said address bus, said third memory having a plurality of memory banks where more of said memory banks are devoted to forming a part of said second memory arrangement than to forming a part of said first memory arrangement.

19. The apparatus of claim 18 wherein each of said first memory is an SDRAM memory, said second memory is an SDRAM memory and said third memory is an SDRAM memory.

20. The apparatus of claim 17 wherein each of said first memory is an SDRAM memory, said second memory is an SDRAM memory and said third memory is an SDRAM memory.

21. The apparatus of claim 17 wherein said first memory is accessed while said second memory is refreshed.

22. The apparatus of claim 17 further comprising a switch, said switch to receive said ingress units after said ingress units have been read from said first memory arrangement, said switch to transmit said egress units before said egress units have been written into said second memory arrangement.

23. A method, comprising:

along an ingress path of a card:
  writing a first ingress unit into a first memory bank of either a first or a second memory with either a first data bus that is coupled to said first memory or with a second data bus that is coupled to said second memory;
  writing a second ingress unit into a first memory bank of whichever of said first and second memories that said first ingress unit was not written into and with whichever of said data busses that said first ingress unit was not said written with;
  refreshing, during said writing of said second ingress unit, whichever memory that said first ingress unit was said written into;
  reading said first ingress unit from said first memory bank of whichever of said first and second memories that said first ingress unit was written into and with whichever of said data busses that said first ingress unit was said written with;
  sending said first ingress unit to a switch; and, along an egress path of said card:
  writing an egress unit, after said egress unit has been sent by said switch, into a second memory bank of the same memory that said first ingress unit was written into and with whichever of said data busses that said first ingress unit was said written with.

24. The method of claim 23 wherein said ingress unit is in ATM cell and said egress unit is an ATM cell.

25. The method of claim 23 wherein said first memory is an SDRAM memory and said second memory is an SDRAM memory.

26. The method of claim 23 wherein said first ingress unit is a first ingress cell, said second ingress unit is a second ingress cell, and said egress unit is an egress cell.

* * * * *